United States Patent
Howard et al.

(10) Patent No.: US 9,860,313 B2
(45) Date of Patent: *Jan. 2, 2018

(54) MAINTAINING STATE SYNCHRONIZATION OF AN APPLICATION BETWEEN COMPUTING DEVICES AS WELL AS MAINTAINING STATE SYNCHRONIZATION OF COMMON INFORMATION BETWEEN DIFFERENT APPLICATIONS WITHOUT REQUIRING PERIOIDIC SYNCHRONIZATION

(71) Applicant: International Business Machines Corporation, Armonk, NY (US)

(72) Inventors: Curtiss J. Howard, Cary, NC (US); Todd E. Kaplinger, Raleigh, NC (US); William A. Nagy, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 918 days.

This patent is subject to a terminal disclaimer.

(21) Appl. No.: 13/904,217

(22) Filed: May 29, 2013

(65) Prior Publication Data

US 2014/0359072 A1    Dec. 4, 2014

Related U.S. Application Data

(63) Continuation of application No. 13/903,130, filed on May 28, 2013.

(51) Int. Cl.
*G06F 15/16*    (2006.01)
*H04L 29/08*    (2006.01)
(Continued)

(52) U.S. Cl.
CPC ......... *H04L 67/1095* (2013.01); *H04W 4/001* (2013.01); *H04W 4/20* (2013.01)

(58) Field of Classification Search
CPC ... H04L 67/06; H04L 67/1095; G06F 3/0486; H04W 4/001; H04W 4/20
(Continued)

(56) References Cited

U.S. PATENT DOCUMENTS 6,049,838 A    4/2000  Miller et al.
6,594,671 B1   7/2003  Aman et al.
(Continued)

FOREIGN PATENT DOCUMENTS

WO    2007128687 A1    11/2007

OTHER PUBLICATIONS

Wang et al.; "A Scalable Queuing Service Based on an In-Memory Data Grid," Proceedings 2010 IEEE 7th International Conference on e-Business Engineering (ICEBE 2010), pp. 236-243, 2010.
(Continued)

*Primary Examiner* — June Sison
*Assistant Examiner* — Dixon Dabipi
(74) *Attorney, Agent, or Firm* — Robert A. Voigt, Jr.; Winstead, P.C.

(57) ABSTRACT

A method, system and computer program product for maintaining state synchronization of an application between computing devices and maintaining state synchronization of common information between different applications. A server receives a request from a client device to access a shared state scope. A shared state scope is a data store that physically resides on the server, where the data store stores state information. The state information stored in these scopes can be shared among multiple instances of an application residing on multiple client devices. Furthermore, the state information may include common information that is shared among different applications. Upon the server providing access to the requested scope, the server receives an update to the state information stored within the requested
(Continued)

scope from the requesting client device. The server then notifies other client devices regarding the update to the state information that have access to the shared state scope.

7 Claims, 6 Drawing Sheets

(51) Int. Cl.
*H04W 4/00* (2009.01)
*H04W 4/20* (2009.01)

(58) Field of Classification Search
USPC .......................................................... 709/219
See application file for complete search history.

(56) References Cited

U.S. PATENT DOCUMENTS

| | | | |
|---|---|---|---|
| 8,463,884 B2* | 6/2013 | Clinton et al. ................ | 709/221 |
| 9,003,299 B2* | 4/2015 | Freedman .................... | 715/745 |
| 9,116,862 B1 | 8/2015 | Rath et al. | |
| 2006/0085594 A1 | 4/2006 | Roberson et al. | |
| 2007/0101326 A1 | 5/2007 | Cai et al. | |
| 2007/0203943 A1 | 8/2007 | Adlung et al. | |
| 2008/0320244 A1 | 12/2008 | Shen et al. | |
| 2009/0112779 A1 | 4/2009 | Wolf et al. | |
| 2009/0172101 A1* | 7/2009 | Arthursson .................. | 709/205 |
| 2010/0262958 A1 | 10/2010 | Clinton et al. | |
| 2010/0275260 A1 | 10/2010 | Bergheaud et al. | |
| 2011/0078274 A1 | 3/2011 | Joachimpillai et al. | |
| 2011/0270855 A1 | 11/2011 | Antonysamy | |
| 2012/0109926 A1* | 5/2012 | Novik .............. | G06F 17/30566 707/707 |
| 2012/0185500 A1 | 7/2012 | Bhogal et al. | |
| 2012/0254175 A1 | 10/2012 | Horowitz et al. | |
| 2012/0278344 A1 | 11/2012 | Berg et al. | |
| 2013/0047165 A1 | 2/2013 | Goetz et al. | |
| 2013/0066832 A1 | 3/2013 | Sheehan et al. | |
| 2014/0095625 A1 | 4/2014 | Quan et al. | |
| 2014/0199979 A1* | 7/2014 | Singhai et al. ............... | 455/418 |
| 2014/0287836 A1 | 9/2014 | Chan et al. | |
| 2014/0289411 A1 | 9/2014 | Bornstein et al. | |
| 2014/0358988 A1 | 12/2014 | Howard et al. | |

OTHER PUBLICATIONS

Bolosky, WJ., et al., "Paxos Replicated State Machines as the Basis of a High-performance Data Store," http://static.usenix.org/events/nsdi11/tech/full_papers/Bolosky.pdf, Feb. 18, 2012.

Anonymous, "Efficient Run-time Scoped Memory Assignment Rules Checking," http://priorartdatabase.com/IPCOM/000210483, Sep. 6, 2011.

IBM, "A Mechanism for Defining Dynamic Event Sequencing Scope," http://www.ip.com/pubview/IPCOM000167189D, Feb. 2, 2008.

Patent Application entitled "Implementing Synchronization of State Information Between Instances of an Application as well as Between Different Applications in an Efficient, Scalable Manner," filed on May 28, 2013.

Office Action for U.S. Appl. No. 13/903,130 dated Jul. 15, 2015, pp. 1-27.

Office Action for U.S. Appl. No. 13/903,174 dated Apr. 8, 2016, pp. 1-31.

Office Action for U.S. Appl. No. 13/904,248 dated Jun. 3, 2016, pp. 1-28.

Office Action for U.S. Appl. No. 13/903,130 dated Jan. 15, 2016, pp. 1-26.

Office Action for U.S. Appl. No. 13/904,248 dated Aug. 25, 2017, pp. 1-20.

* cited by examiner

MAINTAINING STATE SYNCHRONIZATION OF AN APPLICATION BETWEEN COMPUTING DEVICES AS WELL AS MAINTAINING STATE SYNCHRONIZATION OF COMMON INFORMATION BETWEEN DIFFERENT APPLICATIONS WITHOUT REQUIRING PERIOIDIC SYNCHRONIZATION

CROSS-REFERENCE TO RELATED APPLICATIONS

The present application is a continuation application of pending U.S. patent application Ser. No. 13/903,130, which was filed on May 28, 2013, which is assigned to the assignee of the present invention. The present application claims priority benefits to U.S. patent application Ser. No. 13/903, 130.

TECHNICAL FIELD

The present invention relates generally to state synchronization, and more particularly to maintaining state synchronization of an application between computing devices (e.g., between a mobile computing device and a desktop computing device) as well as maintaining state synchronization of common information (e.g., user information) between different applications without requiring periodic synchronization.

BACKGROUND

Today, users may often use multiple computing devices, such as mobile computing devices and desktop computing devices. In addition, such users may utilize multiple instances of an application on these computing devices. For example, instances of an e-mail application may be loaded onto a laptop computer, a smartphone and a desktop computer. In this way, the user may have access to the same application and/or application data on multiple devices. For instance, the user may check an e-mail account on the user's desktop computer at home and then later check the e-mail account on the user's smartphone while running errands.

As a result of having multiple instances of an application on multiple devices, the application state, such as application settings, for each of the instances of the application needs to be synchronized in order for the user to be provided with a seamless and consistent experience. That is, the application state, such as application settings, for each of the instances of the application needs to be synchronized in order for each application to perform consistently regardless of which device the user is using. For example, if the user configures a new e-mail account within an e-mail application on a laptop computer, then the new e-mail account should be reflected within the e-mail application on the user's desktop computer. As a result, the application state for each of the instances of the application needs to be synchronized.

Currently, such instances of an application become synchronized by creating an interface with a remote service (e.g., web services, such as JAX-RS services) and have those instances periodically synchronize in order to maintain consistency. Unfortunately, such a synchronization process occurs at unpredictable times. Furthermore, such a synchronization process may have unpredictable results depending on which application instance is synchronized first.

BRIEF SUMMARY

In one embodiment of the present invention, a method for maintaining state synchronization of an application between computing devices and maintaining state synchronization of common information between different applications comprises receiving a request to access a scope from a first client device, where the scope comprises a data store storing state information. The method further comprises providing access to the state information stored within the scope to the first client device. Additionally, the method comprises receiving an update to the state information stored within the scope from the first client device. In addition, the method comprises notifying, by a processor, one or more other client devices regarding the update to the state information stored within the scope that have access to the scope.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for maintaining state synchronization of an application between computing devices and maintaining state synchronization of common information between different applications. In one embodiment of the present invention, a server receives a request from a client device to access a shared state scope. A shared state scope is a data store (e.g., map, database) that physically resides on the server, where the data store stores state information and includes rules directed to defining the type of state information (e.g., user-wide state information, device-wide state information, application-specific state information) stored within the data store as well as rules directed to defining the lifecycle of the state information (e.g., duration of time that the state information is valid). The state information stored in these shared state scopes can be shared among multiple instances of an application residing on multiple client devices. Furthermore, the state information may include common information (e.g., user information) that is shared among different applications. Upon the server providing access to the state information stored within the requested shared state scope to the requesting client device, the server receives an update to the state information that was performed by the requesting client device. The server then notifies one or more other client devices regarding the update to the state information that have access to the shared state scope. In this manner, the state information of an application is synchronized among multiple instances of the application without requiring periodic synchronization. Furthermore, the state information containing common information used by different applications can be synchronized among these applications without requiring periodic synchronization.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
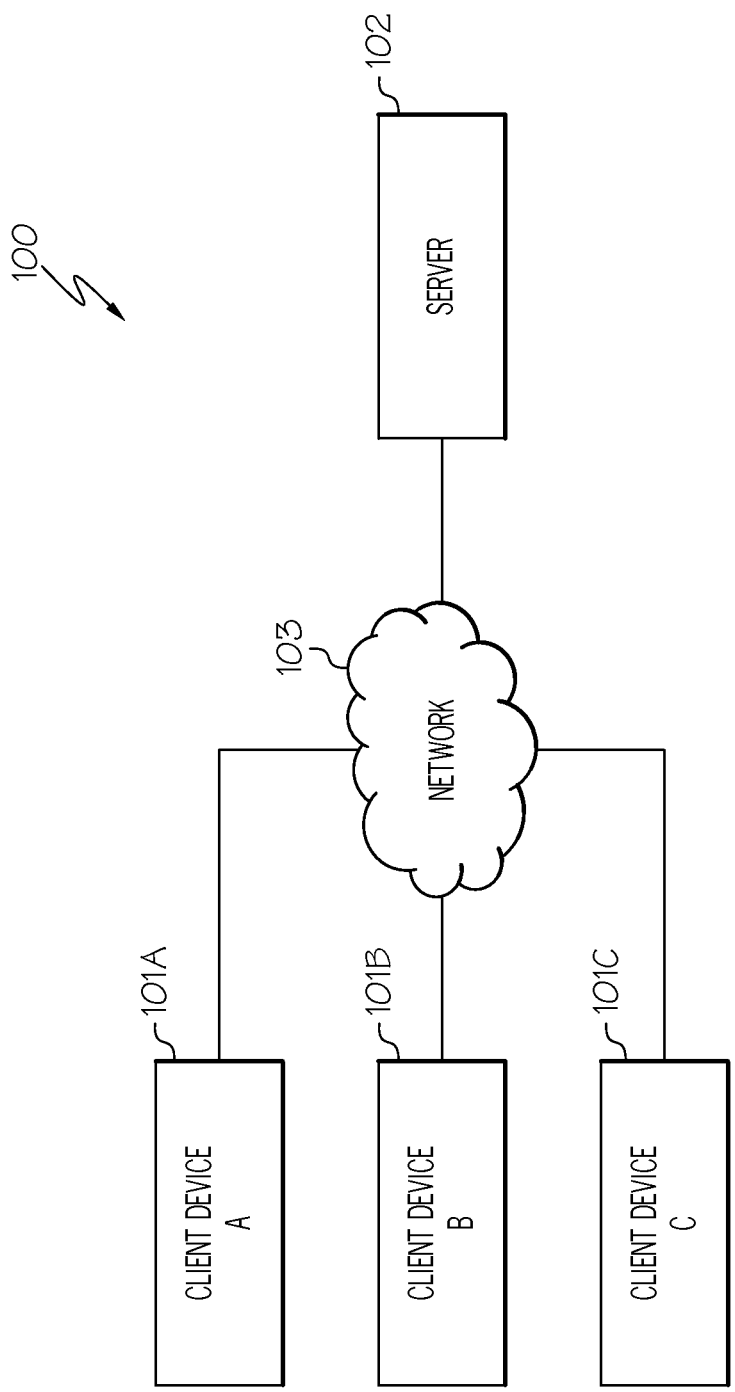
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client devices 101 and server 102 may communicate with each other using any protocol, including, but not limited to, client devices 101 using a Representational State Transfer (REST) service to communicate with server 102 and server 102 using a push channel to communicate with clients 101.

In one embodiment, server 102 is configured to store state information (e.g., application settings) in multiple partitions or "shared state scopes" (also referred to as simply "scopes"). As will be discussed in further detail below, a shared state scope is a data store (e.g., map, database) that physically resides on server 102, where the data store includes rules directed to defining the type of state information (e.g., user-wide state information, device-wide state information, application-specific state information) stored within the data store as well as rules directed to defining the lifecycle of the state information (e.g., duration of time that the state information is valid). Furthermore, the principles of the present invention cover all different types of scopes, including a user scope (partition with user-wide state information), an application scope (partition with application-specific state information), a device scope (partition with device-wide state information) and a global scope (partition of data that any application can access). The state information stored in these shared state scopes can be shared among the multiple instances of an application residing on multiple client devices 101. For example, the state information in a shared state scope can be shared among an instance of an application on a laptop computer and an instance of the application on a desktop computer. Furthermore, the state information may include common information (e.g., user information) that is shared among different applications. For example, common user information may be shared among multiple different applications thereby negating the requirement of each application maintaining a separate copy of common user information. In this manner, the state information of an application having multiple instances on multiple client devices 101 can be synchronized among these client devices 101 (e.g., between a mobile computing device and a desktop computing device) without requiring periodic synchronization as discussed further below. Furthermore, in this manner, the state information containing common information used by different applications can be synchronized among these applications without requiring periodic synchronization as discussed further below. A description of the hardware configuration of server 102 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C and a single server 102, network system 100 may include any number of clients 101 and servers 102. The embodiments of network system 100 are not to be limited in scope to the depiction of FIG. 1.

Figure 2:
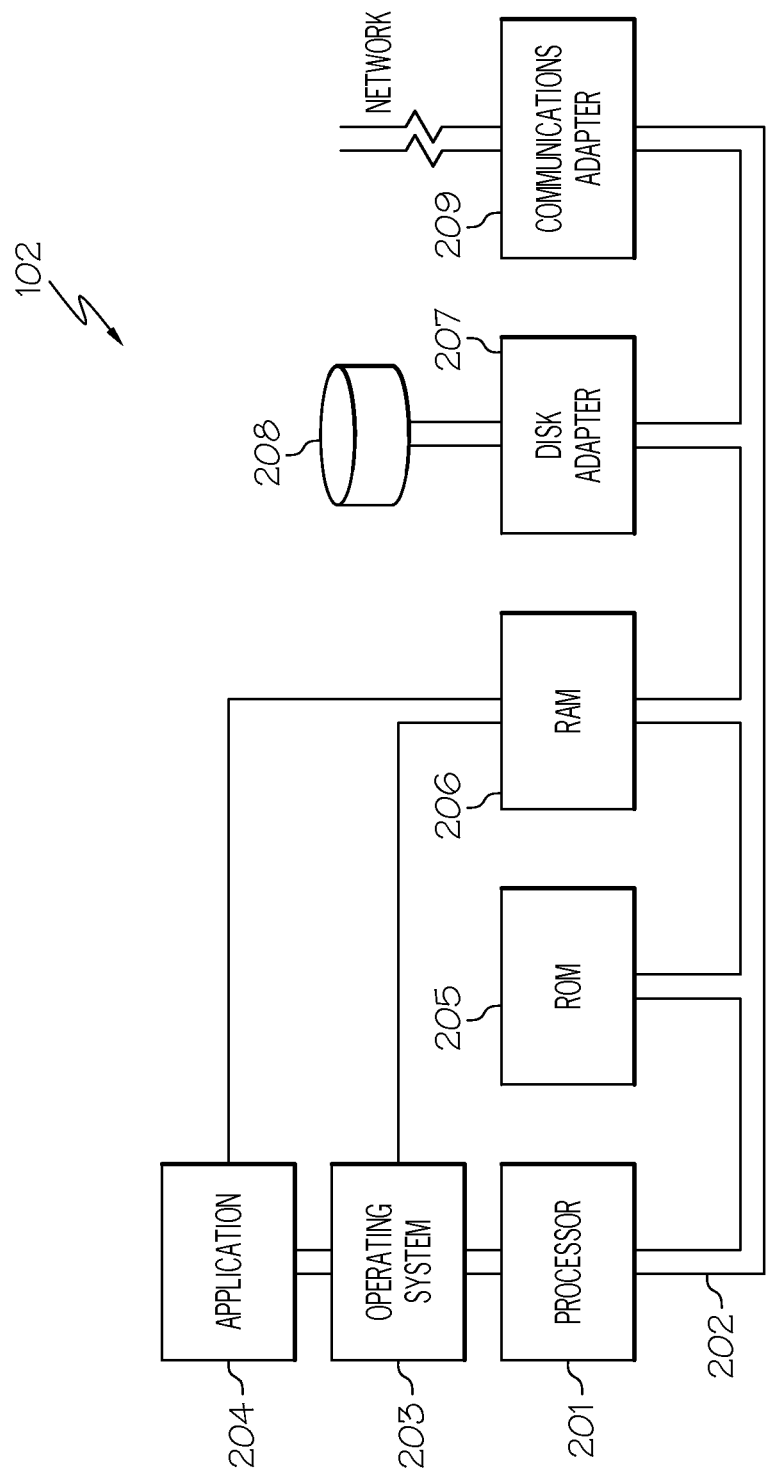
FIG. 2 illustrates a hardware configuration of a server in accordance with an embodiment of the present invention.

Referring now to FIG. 2, FIG. 2 illustrates a hardware configuration of server 102 (FIG. 1) which is representative of a hardware environment for practicing the present invention. Server 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for maintaining state synchronization of an application between computing devices and maintaining state synchronization of common information between different applications as discussed further below in association with FIGS. 3-6.

Referring again to FIG. 2, read-only memory ("ROM") 205 is coupled to system bus 202 and includes a basic input/output system ("BIOS") that controls certain basic functions of server 102. Random access memory ("RAM") 206 and disk adapter 207 are also coupled to system bus 202.

It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. In one embodiment, disk unit 208 stores the shared state scopes (data stores) as discussed further below. It is noted that the program for maintaining state synchronization of an application between computing devices and maintaining state synchronization of common information between different applications, as discussed further below in association with FIGS. 3-6, may reside in disk unit 208 or in application 204.

Server 102 may further include a communications adapter 209 coupled to bus 202. Communications adapter 209 interconnects bus 202 with an outside network (e.g., network 103 of FIG. 1) thereby enabling server 102 to communicate with client 101 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, as a result of having multiple instances of an application on multiple devices, the application state, such as application settings, for each of the instances of the application needs to be synchronized in order for the user to be provided with a seamless and consistent experience. That is, the application state, such as application settings, for each of the instances of the application needs to be synchronized in order for each application to perform consistently regardless of which device the user is using. For example, if the user configures a new e-mail account within an e-mail application on a laptop computer, then the new e-mail account should be reflected within the e-mail application on the user's desktop computer. As a result, the application state for each of the instances of the application needs to be synchronized. Currently, such instances of an application become synchronized by creating an interface with a remote service (e.g., web services, such as JAX-RS services) and have those instances periodically synchronize in order to maintain consistency. Unfortunately, such a synchronization process occurs at unpredictable times. Furthermore, such a synchronization process may have unpredictable results depending on which application instance is synchronized first.

Figure 3:
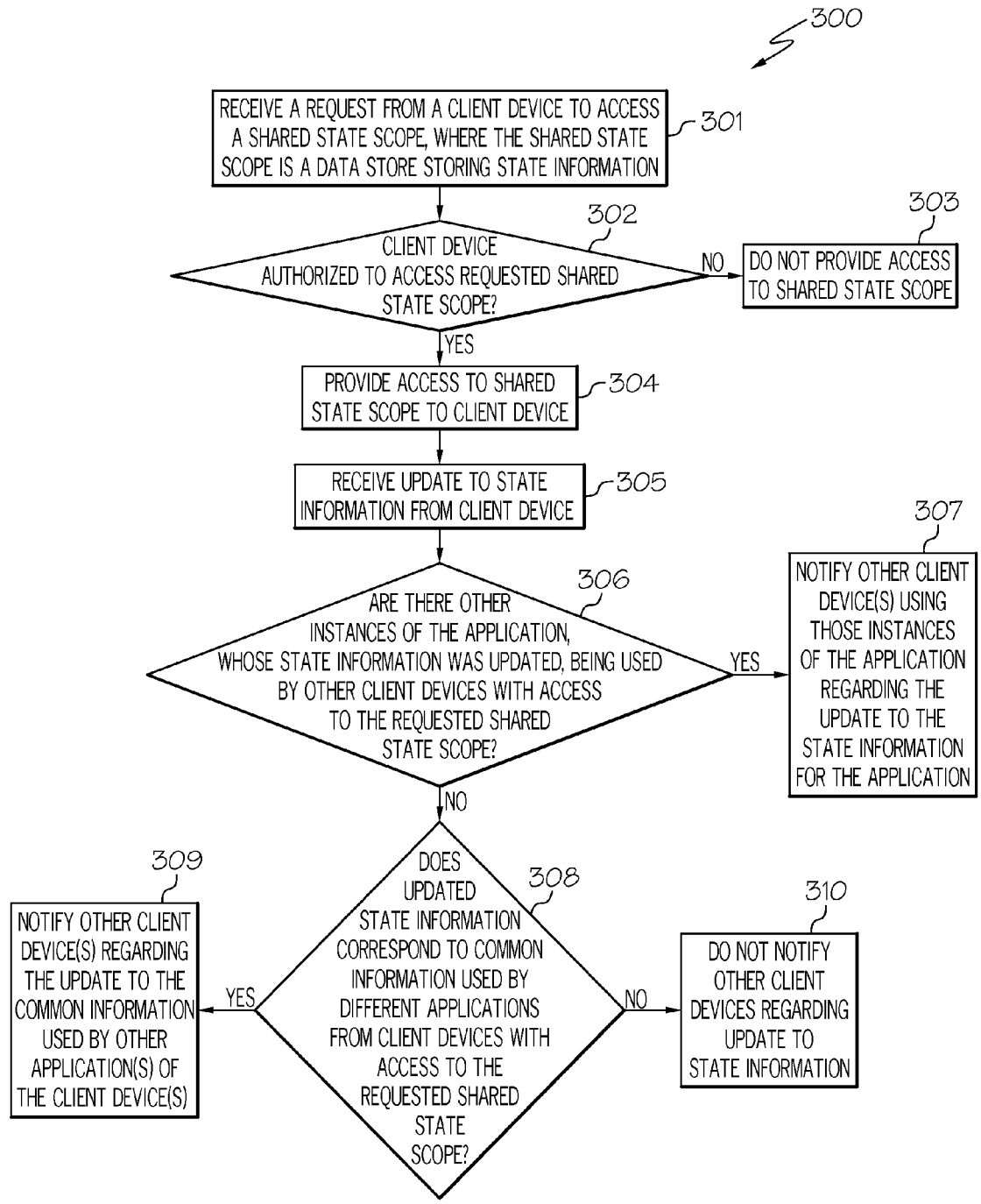
FIG. 3 is a flowchart of a method for maintaining state synchronization of an application between computing devices and maintaining state synchronization of common information between different applications in accordance with an embodiment of the present invention.
Figure 4:
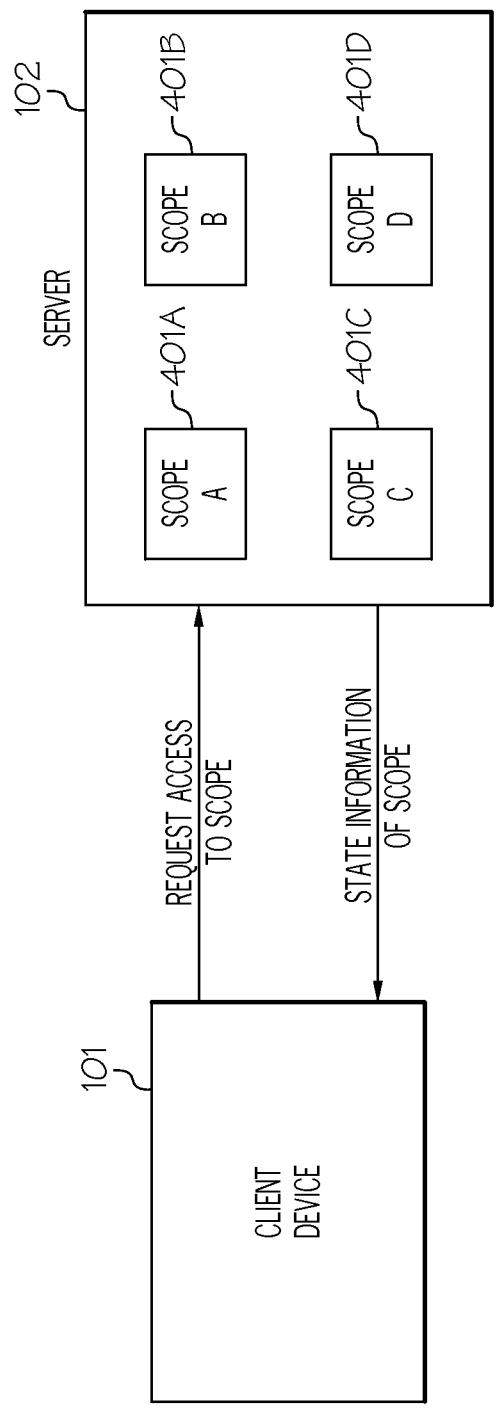
FIG. 4 illustrates a client device accessing state information stored in a shared state scope in accordance with an embodiment of the present invention.
Figure 5:
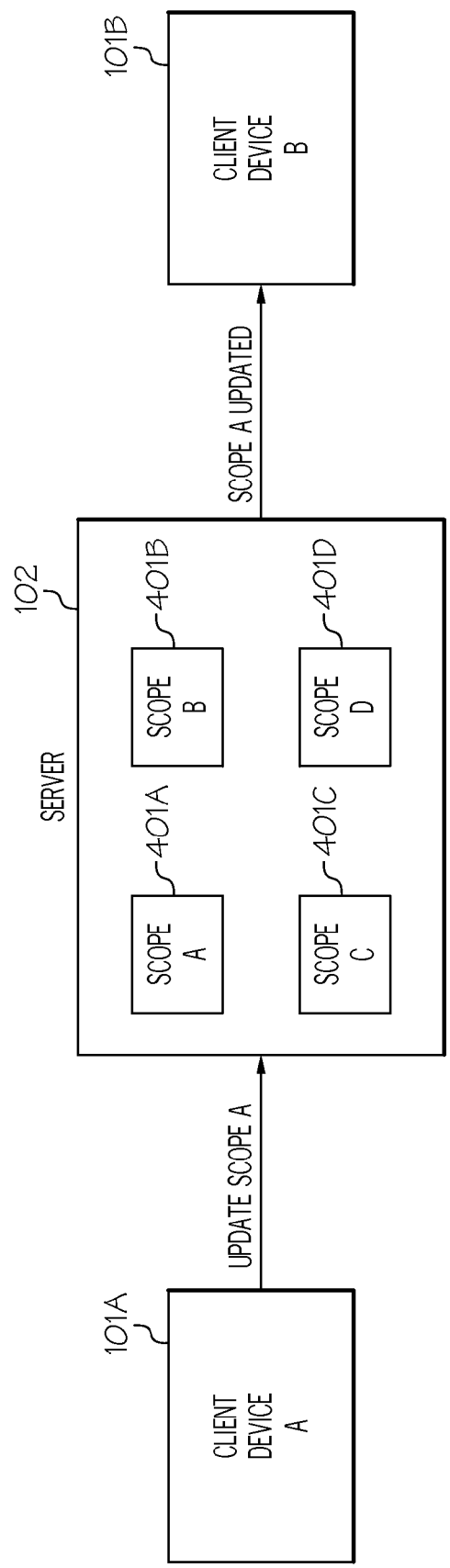
FIG. 5 illustrates synchronizing state information of an application among multiple instances of the application in accordance with an embodiment of the present invention.
Figure 6:
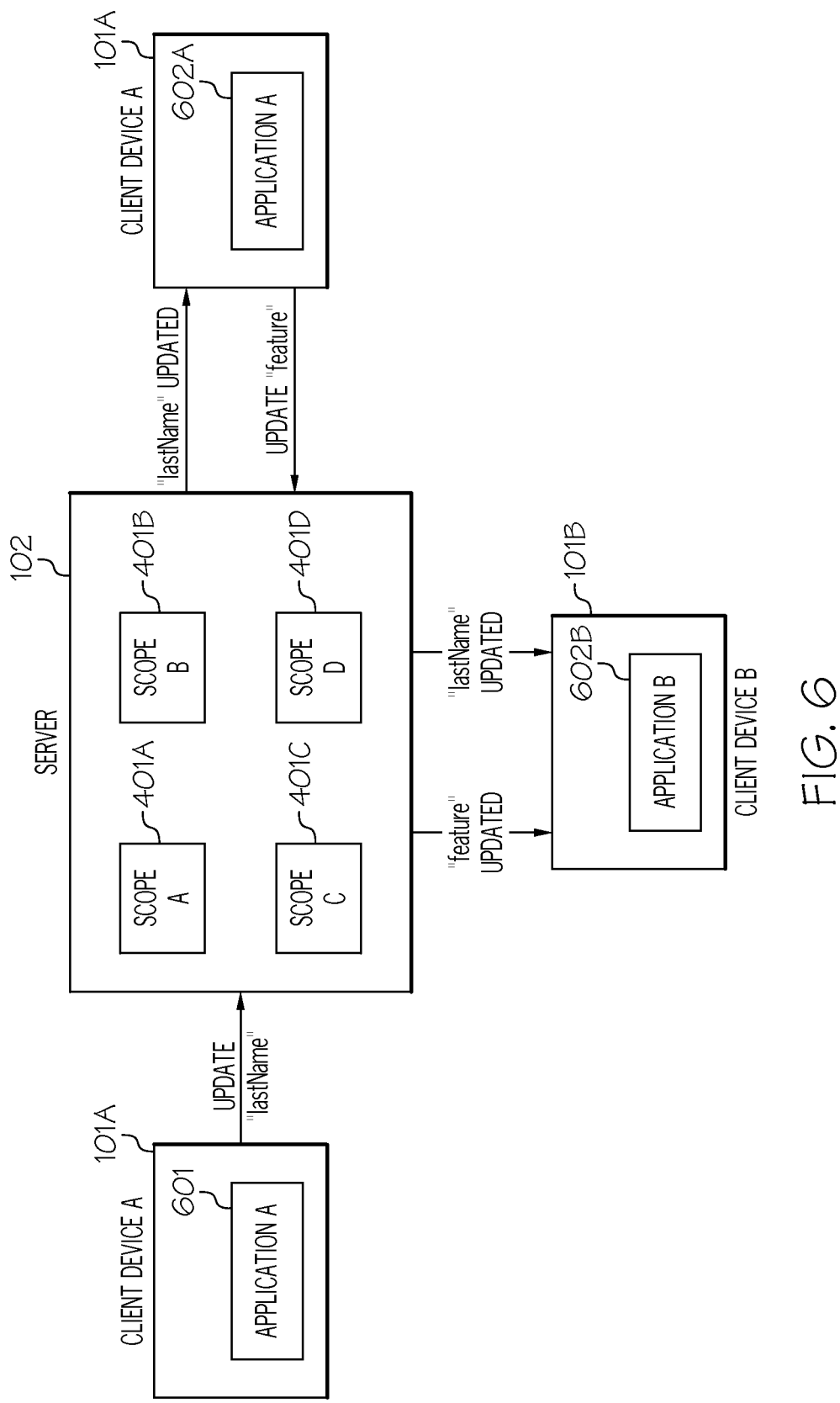
FIG. 6 illustrates synchronizing state information of an application among multiple instances of the application as well as synchronizing common information used by different applications in accordance with an embodiment of the present invention.

The principles of the present invention provide a means for synchronizing the state information of an application among multiple instances of the application without requiring periodic synchronization as discussed further below in connection with FIGS. 3-6. Furthermore, the state information containing common information used by different applications can be synchronized among these applications without requiring periodic synchronization as discussed further below in connection with FIGS. 3-6. FIG. 3 is a flowchart of a method for maintaining state synchronization of an application between computing devices and maintaining state synchronization of common information between different applications. FIG. 4 illustrates a client device accessing state information stored in a shared state scope. FIG. 5 illustrates synchronizing state information of an application among multiple instances of the application. FIG. 6 illustrates synchronizing state information of an application among multiple instances of the application as well as synchronizing common information used by different applications.

As stated above, FIG. 3 is a flowchart of a method 300 for maintaining state synchronization of an application between computing devices and maintaining state synchronization of common information between different applications in accordance with an embodiment of the present invention.

Referring to FIG. 3, in conjunction with FIGS. 1-2, in step 301, server 102 receives a request from client device 101 (e.g., client device 101A) to access a shared state scope, where the shared state scope is a data store (e.g., map, database) configured to store state information. State information, as used herein, refers to information used/accessed by an application, including, but not limited to, user-wide state information, device-wide state information and application-specific state information. Furthermore, in one embodiment, the data store includes rules directed to defining the type of state information (e.g., user-wide state information, device-wide state information, application-specific state information) stored within the data store as well as rules directed to defining the lifecycle of the state information (e.g., duration of time that the state information is valid). The state information stored in these shared state scopes can be shared among the multiple instances of an application residing on multiple client devices 101. For example, the state information in a shared state scope can be shared among an instance of an application on a laptop computer and an instance of the application on a desktop computer. Furthermore, the state information may include common information (e.g., user information) that is shared among different applications. For example, common user information may be shared among multiple different applications thereby negating the requirement of each application maintaining a separate copy of common user information. An illustration of client device 101 requesting to access a shared state scope is provided in connection with FIG. 4.

Referring to FIG. 4, FIG. 4 illustrates client device 101 accessing state information stored in a shared state scope in accordance with an embodiment of the present invention. As illustrated in FIG. 4, client device 101 issues a request (identified by the arrow labeled "request access to scope") to access a shared state scope 401A-401D (identified as "Scope A," "Scope B," "Scope C," and "Scope D," respectively, in FIG. 4) in server 102, such as in disk unit 208. Shared state scopes 401A-401D may collectively or individually be referred to as shared state scopes 401 or shared state scope 401, respectively. As discussed above, each shared state scope 401 may correspond to a partition of data, where each scope 401 corresponds to a data store.

Returning to FIG. 3, in conjunction with FIGS. 1-2 and 4, in step 302, a determination is made by server 102 as to whether the requesting client device 101 is authorized to access the requested shared state scope 401. For example, client device 101 may have to provide configuration information to server 102 in order to be granted access to an instance of the requested shared state scope 401. For instance, if client device 101 is requesting the shared state scope 401 for a particular user, then client device 101 would have to identify the user in question.

If client device 101 is not authorized to access the requested shared state scope 401, then, in step 303, server 102 does not provide access to the requested shared state scope 401 to the requesting client device 101.

If, however, client device 101 is authorized to access the requested shared state scope 401, then, in step 304, server 102 provides access to the state information (e.g., user-wide state information, device-wide state information, application-specific state information) stored within the requested shared state scope 401 to the requesting client device 101 as illustrated in FIG. 4 (identified by the arrow labeled "state information of scope").

In step 305, server 102 receives an update to the state information by the requesting client device 101. For example, once client device 101 obtains the state information stored in the requested shared state scope 401, client device 101 may perform various operations on the state information. For example, if the user of client device 101 configures a new e-mail account within an e-mail application, then the state information directed to application settings is modified/updated to reflect the new e-mail account. Client device 101 may immediately send the update to the state information to server 102 or after a period of time, such as in the case where shared state scope 401 is defined as only being accessible by one client device 101 at a time. In such a scenario (where shared state scope 401 is defined as only being accessible by one client device 101 at a time), client device 101 may simply send all of its updates to server 102 at one particular time.

In step 306, a determination is made by server 102 as to whether there are other instances of the application, whose state information was updated, being used by other client devices 101 with access to the requested shared state scope 401.

If there are other instances of the application, whose state information was updated, being used by other client devices 101 with access to the requested shared state scope 401, then, in step 307, server 102 notifies those client device(s) 101 with access to the requested shared state scope 401 regarding the update to the state information for the application as illustrated in FIG. 5. FIG. 5 illustrates synchronizing state information of an application among multiple instances of the application in accordance with an embodiment of the present invention.

Referring to FIG. 5, if client device 101A had previously received access to the state information from the requested shared state scope 401A and such state information was updated, then client device 101A sends an update to the state information to server 102 (identified by the arrow labeled as "update Scope A"). If there is another client device 101B using an instance of the application whose state information was updated and has access to the updated shared state scope 401A, then server 102 notifies that client device 101B regarding the update to the state information for the application (identified by the arrow labeled as "Scope A updated"). For instance, referring to the example discussed above, if the user of client device 101A (e.g., laptop computer) configures a new e-mail account within an e-mail application, then the state information directed to application settings is modified/updated to reflect the new e-mail account. Such updates will then be notified by server 102 to other client devices 101 (e.g., client device 101B, such as a desktop computer) using another instance of the application. In this manner, the new e-mail account will be reflected within the e-mail application on client device 101B without requiring periodic synchronization.

Referring again to FIG. 3, in conjunction with FIGS. 1-2, if, however, there are no other instances of the application, whose state information was updated, being used by other client devices 101 with access to the requested shared state scope 401, then, in step 308, a determination is made by server 102 as to whether the updated state information corresponds to common information (e.g., user information) used by different applications from client devices 101 with access to the requested shared state scope 401. That is, in step 308, a determination is made by server 102 as to whether the updated state information corresponds to common information (e.g., user information) that is shared among different applications.

If the updated state information corresponds to common information that is shared among different applications from client devices 101 with access to the requested shared state scope 401, then, in step 309, server 102 notifies other client device(s) 101 with access to the requested shared state scope regarding the update to the common information used by other application(s) of the notified client device(s) 101 as illustrated in FIG. 6.

FIG. 6 illustrates synchronizing state information of an application among multiple instances of the application as well as synchronizing common information used by different applications in accordance with an embodiment of the present invention.

Referring to FIG. 6, client device 101A includes an instance of an application designated as "Application A" 601 and an instance of an application designated as "Application B" 602A. Furthermore, as shown in FIG. 6, another client device 101, client device 101B, includes a second instance of "Application B" 602B. Additionally, as illustrated in FIG. 6, client device 101A updates the state information directed to user-wide state information, such as updating the "last-Name" of a user, which is used by "Application A" 601 of client device 101A. As discussed above, client device 101A sends the update to server 102 (indicated by the arrow labeled as "update "lastName""). If such state information is "common information" that is shared among different applications, such as "Application B" 602A-602B, then server 102 notifies other client device(s) 101, such as client devices 101A, 101B, regarding the update to the common information used by other application(s), such as the instances of "Application B" 602A, 602B of client device 101A, 101B, respectively, as illustrated in FIG. 6 (indicated by the arrow labeled as ""lastName" updated"). In this manner, the state information containing common information used by different applications can be synchronized among these applications without requiring periodic synchronization as opposed to requiring each application to maintain their own separate copy of common information.

Furthermore, FIG. 6 illustrates an update to an applications' state information where such an update needs to be reflected among the other instances of the application. For example, as shown in FIG. 6, a feature of "Application B" 602A of client device 101A was updated, and, as a result, client device 101A sends the update to server 102 (indicated by the arrow labeled as "update "feature""). As discussed above in connection with step 307, server 102 notifies those client device(s) 101, such as client device 101B, containing other instance(s) of the application, such as "Application B" 602B, whose state information was updated (indicated by the arrow labeled as ""feature" updated." In this manner, the state information of an application is synchronized among multiple instances of the application without requiring periodic synchronization.

Referring again to step 308 of FIG. 3, in conjunction with FIGS. 1-2, if, however, the updated state information does not correspond to common information that is shared among different applications from client devices 101 with access to the requested shared state scope, then, in step 310, server 102 does not notify other client devices 101 regarding such an update to the state information.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for maintaining state synchronization of an application between computing devices and maintaining state synchronization of common information between different applications, the method comprising:
   receiving a request to access a scope out of a plurality of scopes from a first client device, wherein each of said plurality of scopes corresponds to a partition of data, wherein said scope comprises a data store storing state information;
   providing access to said state information stored within said scope to said first client device;
   receiving an update to said state information stored within said scope from said first client device; and
   notifying, by a processor, one or more other client devices regarding said update to said state information stored within said scope that have access to said scope.

2. The method as recited in claim 1, wherein said data store comprises rules defining a type of state information stored within said data store and defining a lifecycle of said state information.

3. The method as recited in claim 2, wherein said state information comprises one of the following: user-wide state information, device-wide state information and application-specific state information.

4. The method as recited in claim 1, wherein said state information stored within said scope comprises state information for a first application.

5. The method as recited in claim 4 further comprising:
notifying said one or more other client devices regarding said update to said state information for said first application, wherein one or more instances of said first application reside on said one or more other client devices.

6. The method as recited in claim 1, wherein said state information stored within said scope comprises common information shared between a first and a second application.

7. The method as recited in claim 6 further comprising:
receiving said update to said common information used by said first application from said first client device; and
notifying a second client device regarding said update to said common information to be used by said second application of said second client device.

* * * * *